No. 645,015. Patented Mar. 6, 1900.
W. B. & L. C. REED.
ELECTRIC RAILWAY.
(Application filed Oct. 16, 1899.)
(No Model.)
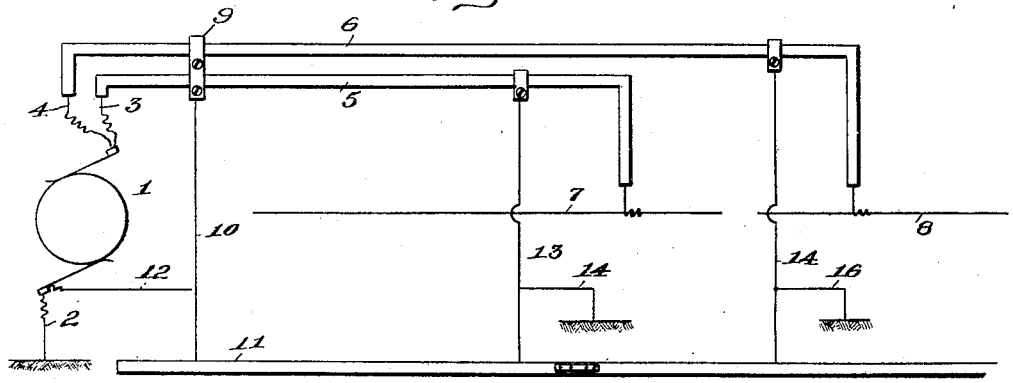
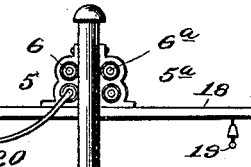
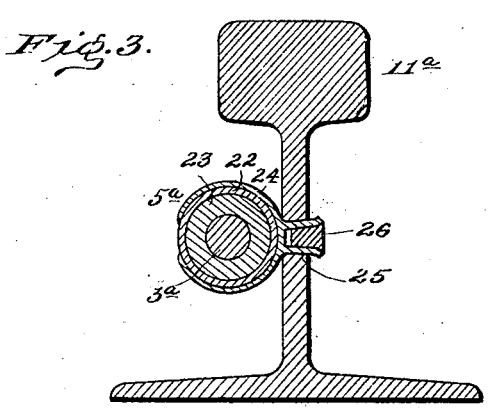
Witnesses:
B. N. Tilden
F. B. Keefer
Inventors
Warren B. Reed
Lyman C. Reed
By James L. Norris
Attorney
THE NORRIS PETERS CO., PHOTO-LITHO., WASHINGTON, D. C.

UNITED STATES PATENT OFFICE.

WARREN B. REED AND LYMAN C. REED, OF NEW ORLEANS, LOUISIANA.

ELECTRIC RAILWAY.

SPECIFICATION forming part of Letters Patent No. 645,015, dated March 6, 1900.

Application filed October 16, 1899. Serial No. 733,781. (No model.)

*To all whom it may concern:*

Be it known that we, WARREN B. REED and LYMAN C. REED, citizens of the United States, residing at New Orleans, in the parish of Orleans and State of Louisiana, have invented new and useful Improvements in Electric-Railway Systems, of which the following is a specification.

Our invention relates to systems of electrical distribution for tramway purposes, the object of the same being to obtain a grounded metallic return-conductor of low resistance and a consequent closer regulation and economy in operation and maintenance of the system, a protection to life and property, an elimination of the present interference with other circuits, and a practical elimination of electrolytic action on adjacent gas and water pipes and metallic cables.

In carrying out our invention we employ a system of feeders, either overhead or underground, consisting of metallic-sheathed cables, the sheathings of which are utilized for the return feeders of the system, are highly insulated from the interior conductor, are grounded at every available point, and are connected to the rails wherever practicable.

Certain details also form part of the invention, which will be hereinafter described and claimed.

In the drawings forming part of this specification, Figure 1 is a diagrammatic view illustrative of our improved system. Fig. 2 is an elevation of one of the grounded metallic supporting-poles with the feeder-cables and rails bonded thereto in cross-section. Fig. 3 is a cross-section of one of the rails, showing a feeder-cable connected thereto and supported thereby.

Like reference-numerals indicate like parts in the different views.

The generator 1 has one brush thereof grounded, as shown at 2, and the other brush connected with the interior conductors 3 and 4 of the feeder-cables 5 and 6. Said interior conductors are highly insulated from the metallic sheathings of the cables 5 and 6 and are connected to the trolley-wire sections 7 8. The metallic sheathings of said cables are also bonded together, as shown at 9, and connected through the wire 10 with the rails 11. The said rails and the said sheathings are also grounded through the wire 12, which is connected to the grounded brush of the generator 1, as clearly shown. The sheathings of each of the cables 5 and 6 are also connected at intervals with the rails 11 through the wires 13 and 14, which wires are grounded, as at 15 and 16. By this construction it will be seen that the metallic sheathings of the feeder-cables 5 and 6 and the rails 11 are bonded together at every available point and grounded both at the generator and at points throughout the distribution. The ends of the rail-sections may also be bonded together, if desired.

In Fig. 2 of the drawings we have shown a form of construction adapted to the overhead system, in which 17 represents a metallic pole well seated in the ground, having a cross-arm 18 thereon, upon which are supported trolley-wires 19 19, fed through the wires 20 from the interior conductors of the metallic-sheathed cables, constituting the feeders 5, 6, $5^a$, and $6^a$. The metallic sheathings of these feeder-cables are bonded together and metallically connected to the poles 17, thereby doing away with the necessity of insulators and the like. The rails 11 are bonded to each other and to the poles 17 through the wires 21 21, as shown, the said wires and poles also serving to effectually ground said rails.

In Fig. 3 is shown a modified form of construction wherein the feeder-cables are supported upon the rails themselves, with their sheathings electrically connected thereto and grounded. $11^a$ represents one of the rails, and $5^a$ one of the feeder-cables, $3^a$ being the interior conductor thereof and 22 being the outer metallic sheathing, separated from the interior conductor by insulation 23. Embracing the cable $5^a$ is a tubular clip or clamp 24, of conducting material, soldered or otherwise electrically connected to the metallic sheathing 22 of said cable, the same having a tubular laterally-extending stem 25 thereon, which fits within an opening in the web of the rail $11^a$ and is secured in place by means of a wedge-pin 26. By this construction it will be seen that the metallic sheathing of the feeder-cable is electrically connected to the rail, which rail is grounded at every available point, as shown in Figs. 1 and 2.

In the overhead systems of distribution of electric-railway current now in common use the trolley-wires are fed in sections by feeders leading from a central station or plant. These feeders are of the same potential, usually positive, and the negative side of the generator or other source of electrical energy is grounded. There are also other grounds placed at various points on the system. In order to furnish as good a return as possible, the rails are bonded together and connected to these grounds, the object being to utilize the earth as far as possible for a return-conductor in multiple with the bonded rails. This grounding of the system, however, is usually imperfect, and as the grounds are placed at some distance apart the current leaving the rails to parallel paths, such as water-mains or gas-mains, often does so through a resistance which causes the setting up of electrolytic action. If the rails were perfectly grounded at all points, there could be no electrolytic action, as there would be no difference in potential between the rails and the other parallel grounded paths. Besides, the bonding of the rails together is always more or less imperfect, and where the traffic, and consequently the current flow, is large the loss upon the bonded rails is often of such a ratio as to necessitate the carrying back of return metallic feeders to the source of supply. These return-feeders are connected to the rails at various points and are placed upon insulators to insure their separation both electrically and mechanically from the positive feeders.

Where the system is underground, the feeders are usually incased in lead-sheathed cables, are run in conduits, and are connected to the underground trolley or its equivalent in one way or another, according to the system employed. The lead casings of these underground feeders are often subjected to electrolytic action from the fact that they are not perfectly grounded or perfectly connected to the rails, and current leaking from the rails to them or from them causes in many instances deleterious electrolytic action. As above intimated, in the present system there is always more or less electrolytic action, and the gas or water pipes which are adjacent to the rails of the system always suffer more or less from this cause. The only way to prevent this electrolytic action is to employ a double trolley and dispense with the grounded return. The electrolytic action may be made less serious, however, by increasing the effectiveness of the bonds between the rails and by connecting the system of rails to gas and water mains wherever there exists a difference of potential between them.

In our system we run the feeders, whether overhead or underground, in metallic-sheathed cables and employ the sheathings of these cables for a continuous metallic return-conductor. In overhead construction these cables are simply clamped to metallic poles, as shown in Fig. 2 of the drawings, without the intervention of any insulation, thereby doing away with all insulators of glass or porcelain and effecting by this direct clamping of the sheathing to the pole a convenient and effectual ground at every few feet of the system. We also effectually bond the rails to each of these grounded poles. In this way the metallic cable-sheathings or return-conductors and the rails are placed in parallel at every available point. By our invention, therefore, the current, instead of having to be carried by the rails and the defective bonds to the source of supply, being relieved only by what leaks to the earth and gas and water mains or flows to the earth at various grounds placed upon the system, is furnished a return of low resistance over the continuous metallic sheathing of the feeder-cables. Besides, the sheathing, which acts as a return-conductor, is placed in multiple with the track at every pole and is grounded at every pole, placing the earth in multiple with it at numerous points instead of only occasionally, as according to the present system. From the fact that the track does not have to carry the accumulated current from many cars along its length on account of the low-resistance metallic return being placed in multiple with it the present bonding of the rails may be done away with, if desired, and the bonds between the rails and the grounded poles substituted therefor. Furthermore, as the metallic sheathing of the feeder-cables is grounded at every few feet of the system, an absolute protection to these feeders from any high-tension currents which might come in contact with them is obtained, and these feeders are prevented from doing injury to any other system.

In the present system, particularly where metallic poles are used and in wet weather, there is a continual leakage across the insulators to ground, which is not only a loss to the system, but is a source of danger and has, in fact, caused many accidents. In our system, where the metallic sheathing entirely surrounds the insulated conductor, it is impossible for any leakage to take place other than across the insulation between the interior conductor and the grounded exterior conductor. As the exterior conductor is grounded at many points, it can be of no other potential under any circumstances than the earth, and therefore any leakage from the interior conductor can only cause a breakdown in the insulation, resulting in a burn-out or opening of a circuit-breaker controlling the feeder. By our system, therefore, we overcome the danger to life as far as the feed-wires are concerned and also overcome all danger from crosses with other circuits.

In the underground system the metallic-sheathed cables may be connected to the rails at as many points as desired. If the feeders are run in conduits, the casings may be further grounded at each manhole. The cables may, however, be placed in direct contact with the rails, as shown in Fig. 3 of the drawings, and clamped thereto, affording in this manner a continuous metallic return in direct contact with and bonded to the rails practically along their entire length. One or as many connections as desired are made to each rail, and the present method of bonding the rails is avoided. Where metallic cross-ties are employed and the rails rest directly upon them, the metallic sheathings of the cables may be directly clamped to these cross-ties and further grounded at every available point. The underground feeders supply the trolley or its equivalent in any desired manner, according to the system employed.

It is evident from the foregoing that the use of the outer metallic sheathings of the feeder-cables for a return-conductor which is grounded at every available point cannot interfere with any other system which is similarly installed. It is, on the other hand, of advantage to thoroughly bond together the metallic sheathings of the cables of all the systems, thereby making one large conductor common to all systems, well grounded, so that it is of the same potential as the earth at all points. Each one of the cable-sheathings surrounds its interior insulated conductor, which interior conductor is prevented from coming in contact with the current carried by all the other interior conductors no matter what their potentials may be. In this way the advantage is obtained of being able to place all the wires of various systems on one metallic pole without insulation and without the necessity of mechanical or electrical separation or insulation between the cables of the various systems. The bonding of the cable-sheathings of all the systems together furnishes a common metallic conductor so well grounded that it is of practically no resistance. The return or grounded side of any system so constructed may therefore be considered to have practically no loss due to ohmic resistance.

Having now described our invention, what we claim as new is—

1. In an electric-railway system, feeders in metallic-sheathed cables, the sheathings of which are bonded to each other and constitute a common return-feeder, trolley-wire sections fed from said feeders, and metallic rails bonded to each other and to the bonded sheathings of the feeder-cables.

2. In an electric-railway system, feeders in metallic-sheathed cables, a generator for supplying current to said feeders having one side grounded, trolley-wire sections connected with said feeders, and metallic rails, the sheathings of said cables being grounded and connected with said rails.

3. In an electric-railway system, feeders in metallic-sheathed cables, a generator for supplying current to said feeders having one side grounded, trolley-wire sections connected with said feeders, and metallic rails, the sheathings of said cables being bonded and grounded and connected to the grounded side of said generator and to said rails.

4. In an overhead electric-railway system, grounded metallic poles, feeders in metallic-sheathed cables supported thereby and having their sheathings bonded to said poles, trolley-wire sections supplied from said feeders, and rails bonded together and to said poles, as and for the purpose set forth.

In testimony whereof we have hereunto set our hands in presence of two subscribing witnesses.

WARREN B. REED.
LYMAN C. REED.

Witnesses:
JOHN D. MAENT, Jr.,
WM. R. MASON.